United States Patent [19]

Schollmeier et al.

[11] Patent Number: 4,695,998
[45] Date of Patent: Sep. 22, 1987

[54] METHOD AND CIRCUIT ARRANGEMENT FOR THE COMPENSATION OF ECHO SIGNALS

[75] Inventors: Gero H. J. Schollmeier, Gauting; Heinrich Sailer, Neuried, both of Fed. Rep. of Germany

[73] Assignee: Siemens Aktiengesellschaft, Berlin and Munich, Fed. Rep. of Germany

[21] Appl. No.: 634,850

[22] Filed: Jul. 26, 1984

[30] Foreign Application Priority Data

Jul. 29, 1983 [DE] Fed. Rep. of Germany ....... 3327467

[51] Int. Cl.$^4$ .............................................. H04B 3/20
[52] U.S. Cl. .................................... 370/32.1; 379/411
[58] Field of Search ............... 179/170.2, 170.6, 170.8; 370/32

[56] References Cited

U.S. PATENT DOCUMENTS

| 4,072,830 | 2/1978 | Gitlin et al. ...................... 179/170.2 |
| 4,074,086 | 2/1978 | Falconer et al. .................. 179/170.2 |
| 4,539,674 | 9/1985 | Carlqvist et al. ..................... 370/32 |

FOREIGN PATENT DOCUMENTS

| 0070236 | 1/1983 | European Pat. Off. ......... 179/170.2 |
| 2920575 | 9/1981 | Fed. Rep. of Germany . |
| 3120639 | 5/1983 | Fed. Rep. of Germany . |
| 83/01876 | 5/1983 | PCT Int'l Appl. .............. 179/170.2 |

OTHER PUBLICATIONS

IBM Technical Disclosure Bulletin, vol. 12, No. 7, Dec. 1969, p. 980, "Binary Synchronous Communication Internal Clock.
IEEE, vol. Com-30, No. 9, Sep. 1982, pp. 2074-2082, T. Suzuki et al., "Line Equalizer for a Digital Subscriber Loop Employing Switched Capacitor Technology".
IEEE, vol. Com-30, No. 9, Sep. 1982, pp. 2095-2108, O. Agazzi et al., "Large-Scale Integration of Hybrid Method Digital Subscriber Loops".

Primary Examiner—Gene Z. Rubinson
Assistant Examiner—R. Vaas
Attorney, Agent, or Firm—Jeffrey P. Morris

[57] ABSTRACT

For the compensation of echo signals occuring in the course of the duplex transmission of digital signals by the dual channel system in signal transmission equipment provided with an echo compensator, the equipment is designed so that the clock pulses emitted by a timing generator for the transmission of the digital signals can be shifted in phase by predetermined phase grid steps. When a change in the phase position of the clock pulses takes place within one phase grid step, correction signals are generated, with the phase position that has been accurately set in each case being maintained. These correction signals are subtracted, together with the compensation signals emitted by the echo compensator for the compensation of the echo signals, from the digital signals received together with the echo signals.

10 Claims, 3 Drawing Figures

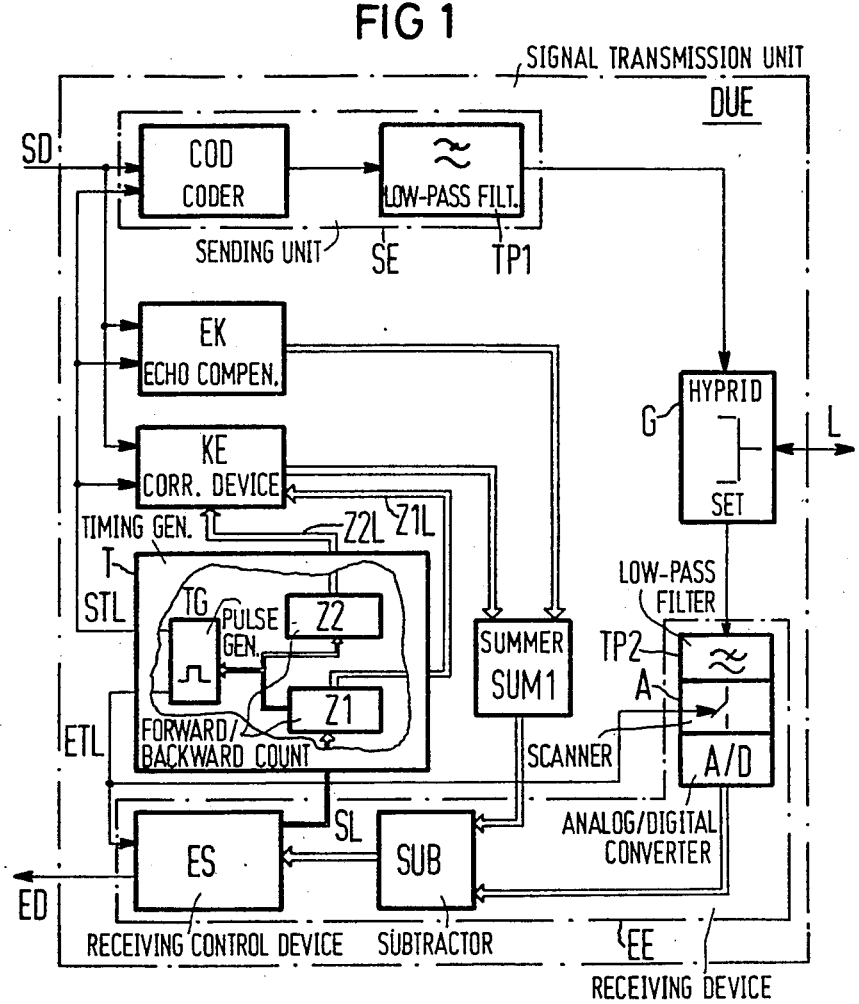

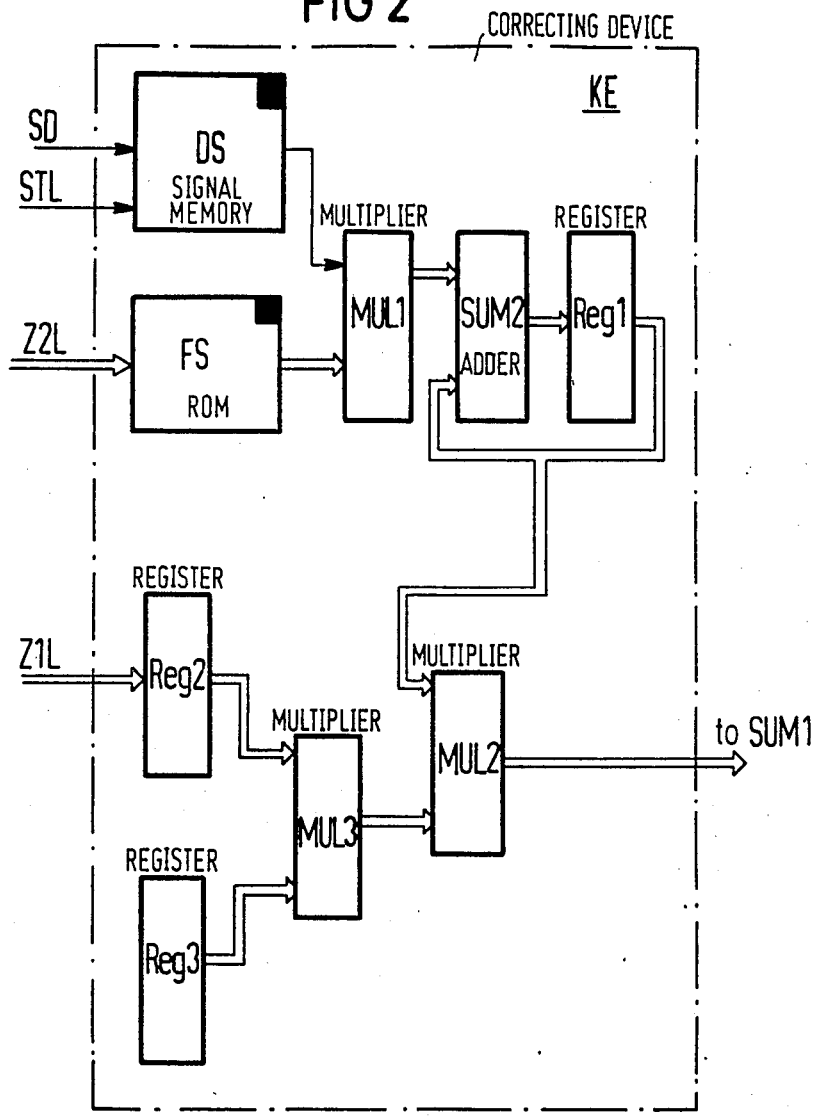

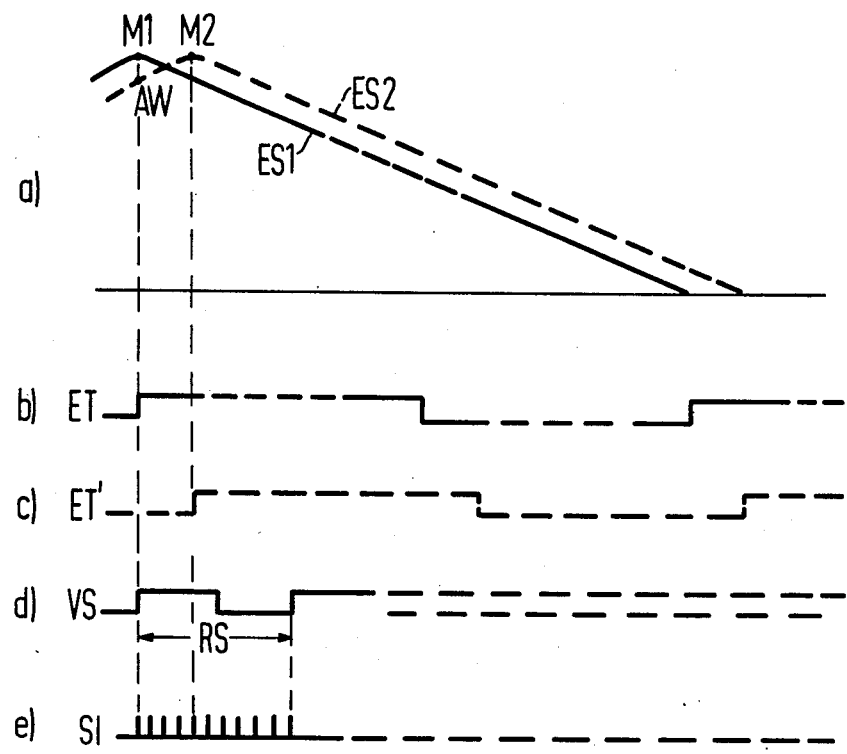

METHOD AND CIRCUIT ARRANGEMENT FOR THE COMPENSATION OF ECHO SIGNALS

BACKGROUND OF THE INVENTION

The invention relates to a process and a circuit arrangement for the compensation of echo signals in signal transmission equipment for the duplex transmission of digital signals. Such transmission equipment is connected in a duplex channel system with a two-wire line and each unit includes a sending device and a receiving device, with, on the one hand, compensation signals being generated in each case by an echo compensator for the compensation of the echo signals that occur in the associated receiving device when digital signals are fed by the sending device of a signal transmission unit to the two-wire line. These compensation signals are subtracted in the receiving device of the signal transmission unit in question from the digital data signals that are received with the echo signals at scanning times that occur in uniform time intervals, and, on the other hand, with adjustment data being fed by the receiving device to a timing generator in order to regulate the phase position of the clock pulses of a clock pulse sequence which determine the scanning times by their occurence.

It is already a known procedure to arrange for the compensation of echo signals in signal transmission equipment for the duplex transmission of digital signals, which is connected in a duplex channel system with a two-wire line, by providing an echo compensator in each case, which generates compensation signals that are patterned on the time sequence of the echo signals and are subtracted from the digital signals received with the echo signals. For this purpose it is possible, for example, when the digital signals are fed from one of the signal transmission units to the two-wire line, to form in the associated echo compensator an echo compensator value for each signal bit that is fed in, which is subtracted from a signal bit of the digital signals received with the echo signals that is scanned in the receiving device at a certain moment. This presupposes that the scanning times determined for scanning the individual signal bits have an extremely high constancy. Even small deviations from the scanning times can produce large, uncompensated echo components, since the echo signals that occur in a signal transmission unit when digital signals are transmitted over substantial distances can be significantly greater than the actual digital signals that are fed to the signal transmission unit in question as receiver signals. The high constancy of the scanning times that is required for the interference-free operation of signal transmission equipment of this kind can then be achieved by providing in each unit of the signal transmission equipment a timing generator which digitally corrects even the slightest fluctuations of the phase position of the clock pulses that determine the scanning times by their occurence. For this purpose, it is necessary to include a shift pulse in order to shift the phase position, whose frequency is significantly higher than the frequency of the digital signals to be transmitted. If the signal transmission speed is high, this may mean that the shift pulse can no longer be processed with conventional integrated circuits in digital technology.

SUMMARY OF THE INVENTION

The object of the invention is to provide a method and circuit by which it is possible to compensate for echo signals in signal transmission equipment where a process of the kind described above is used, even when a shift of the phase position of the scanning times in such equipment takes place only in rough steps.

The problem described above is solved in the case of a method of the kind considered above according to the invention as follows: When control data requiring a shift in the phase position of the clock pulses by an amount lying within a predetermined phase grid step is received from the receiver unit, the data in question are accumulated, with the phase position that has been accurately set in each case being maintained. On the basis of the accumulated control data are formed correction signals that are to be summed with the above-mentioned compensation signals, in such a manner that echo signals that remain uncompensated as a result of the required, but not accomplished, shift in the phase position of the clock pulses are pratically eliminated. When a prescribed upper threshold is exceeded, or when a prescribed lower threshold is not reached, by the accumulated control data, the phase position of the clock pulses is shifted by only one phase grid step.

The invention has the advantage that if the scanning times change, a shift in the phase position of the clock pulses that determine the scanning times is required only in rough phase grid steps. Instead of a fine shift in the phase position, correction signals that are to be summed with the compensation signals are generated. In this way it is possible to use in each unit of the signal transmission equipment a timing generator that operates with a shift pulse having a relatively low frequency and is constructed of conventional integrated circuits in digital technology.

Other features and advantages of the present invention will become apparent from the following detailed description, and from the claims.

For a full understanding of the present invention, reference should now be made to the following detailed description and to the accompanying drawings.

BRIEF DESCRIPTION OF THE DRAWINGS

FIG. 1 shows diagrammatically a circuit diagram of a signal transmission unit, in which the invention is applied.

FIG. 2 shows diagrammatically a circuit diagram of the detailed construction of a correction device, which is represented only schematically in FIG. 1.

FIG. 3 shows a pulse diagram for an embodiment of the invention.

DETAILED DESCRIPTION

FIG. 1 shows signal transmission unit DUE, which may be connected by means of signal sending line SD and signal receiving line ED with a signal sending-/receiving unit and through hybrid set G with two-wire line L. The signal sending/receiving unit may in this case be either a subscriber terminal set or a station of an exchange. The two-wire line L may be a subscriber line designed for the duplex transmission of digital signals in a duplex channel system, at whose other end another signal transmission unit DUE is connected.

Connected to the above mentioned signal sending line SD is sending unit SE, which receives the digital signals emitted by the signal sending/receiving unit and, after converting them into a form suitable for transmission on the two-wire line, feeds them as sending signals to hybrid set G. For this purpose the sending device has a coder COD, which might, for example, convert binary signals into pseudo-ternary signals. For this conversion sending clock pulses are fed to the coder over a sending pulse line STL from a timing generator T. A low-pass filter TP1 is connected downstream of the coder for the pulse formation of the converted digital signals.

Hybrid set G feeds, on the one hand, the sending signals transmitted to it by sending device SE to two-wire line L and, on the other hand, receives the digital signals fed to it from another signal transmission unit as received signals over the two-wire line. It then transmits these signals to receiving device EE of the signal transmission unit. In addition to these received signals, the hybrid set also feeds to the receiving device interference signals referred to as echo signals, which are generated when the sending signals are emitted either directly in the hybrid set as the result of incomplete decoupling of the transmission paths or at reflection points in the two-wire line. As a result there occurs at the output of hybrid set G not only the actual received data signals, but a signal-mixture consisting of these true data signals and the echo signals. Furthermore, in this signal-mixture the echo signals on a long two-wire line may be substantially larger than the actual received signals, by as much as 40 dB.

In receiving device EE the signal-mixture mentioned above first passes through low-pass filter TP2 in order to eliminate signal components with higher frequencies. Downstream of the low-pass filter is connected scanner A, which, at predetermined moments, scans the signal-mixture after the frequencies have been "trimmed." The scanning times in this case can be chosen in such a manner that each digital signal (signal bit) transmitted on the two-wire line is scanned one or more times. To accomplish this, scanner A receives appropriate receiving clock pulses from the abovementioned timing generator T over receiving pulse line ETL. The scanning values obtained in this manner are then fed to an analog/digital converter A/D, which emits coded bit groups corresponding to the scanning values in question at its parallel outputs. The individual bit groups, which continue to represent, in coded form, scanning values of the frequency-trimmed signal-mixture, then trigger the first inputs of subtractor SUB. Other inputs of this subtractor receive, simultaneously with each bit group, a bit group corresponding to the echo component contained in the first bit group, so that at the output of the subtractor there occur bit groups that now contain practically speaking only the signal components corresponding to the received data signals, in coded form. Finally, binary signals are derived from these bit groups in receiving control device ES connected downstream of the subtractor. These signals are then fed, through signal receiving line ED mentioned above, to the sending/receiving device that is connected to the signal transmission unit. For this purpose, the receiving control device receives receiving clock pulses, conducted from timing generator T over the receiving pulse line ETL referred to earlier.

The receiving control device also has a device for regulating the phase of the clock pulses generated by timing generator T. This device provides control data over conducting system SL, whenever it becomes necessary to shift the phase position of the clock pulses by a predetermined amount in a specific direction. Receiving control devices ES can be designed in the manner described in "IEEE Transactions on Communications," Vol. COM-30, No. 9, September 1982, 2074–2082, particularly in FIGS. 2 and 11.

By way of brief explanation of the device described therein, receiving control device ES can include an equalizer configuration of a $\sqrt{f}$ equalizer and a BT automatic equalizer for obtaining the mentioned binary signals from the received signals transmitted to it via the other elements of receiving device EE, the hybrid G and the two-wire line. The just mentioned configuration for regulating the phase position of the clock pulses is connected to this equalizer configuration. This configuration may include, for example, a wave difference method phase detector consisting of a switched capacitor filter arrangement and a follow-on comparator for determining desired phase shifts. Depending on the direction of the phase shift, this phase detector generates at its output a phase shifting forward or backward pulse.

In order to generate the bit groups fed to subtractor SUB in order to eliminate the echo components, an echo compensator EK is provided on the input side, which is connected with signal sending line SD and sending pulse line STL. It delivers instantaneous values of compensation signals in the form of coded bit groups, in accordance with the digital signals occurring on the signal sending line. These instantaneous values can, for example, be stored in memory cells of a memory belonging to the echo compensator. These memory cells are triggered to release the bit groups according to the sending signals fed to the echo compensator. On the output side, the echo compensator is connected with the first inputs of summer SUM1. At other inputs, there are fed to this summer, as will be described in greater detail below, from a correcting device KE, in the form of coded bit groups, the correction signals to correct the compensation signals in the event of fluctuations of the phase position of the scanning times. This correcting device is connected on the input side with signal sending line SD. The output of summer SUM1 is connected to the abovementioned inputs of the subtractor SUB.

Finally, FIG. 1 also shows a section of the timing generator T that has been mentioned earlier. It has pulse generator TG, which emits the sending clock pulses and the receiving clock pulses. These clock pulses can be shifted with regard to their phase, according to the adjustment data fed to the pulse generator, in predetermined phase grid steps. These adjustment data are emitted by a forward/backward counter Z1 that operates as an accumulator and receives at its counting inputs, over conducting system SL, the abovementioned control data that are prepared by receiving control device ES. In this case, the control data determine the counting direction of the forward/backward counter itself.

The individual control data are first accumulated in this manner. Not until a predetermined upper reading of the counter (upper threshold) is exceeded or a lower reading of the counter (lower threshold) is not reached, is a corresponding adjustment datum fed to the pulse generator. The adjustment datum then causes a shift of the phase position of the clock pulses by a predetermined phase grid step in one direction or the other. The adjustment data also control another forward/backward counter Z2. When an adjustment datum of this kind is emitted, the forward/backward counter Z2 is simultaneously returned to its starting position. The instantaneous readings of the two forward/backward counters are fed over respective conducting systems Z1L, Z2L, to the abovementioned correcting device KE for the computation of the correction signals that depend on the phase position of the clock pulses. Correcting device KE also receives the sending clock pulses from pulse generator T.

In FIG. 2, the construction of correcting device KE is shown in greater detail. This correcting device has signal memory DS, in which it is possible to store the digital signals (signal bits) that occur on signal sending line SD for a predetermined number m of sending clock pulses; that is, it is possible to store the digital signals occurring at the times $t_{(m-1)}$ to t. One possibility for the signal memory is a shift register whose individual registration positions can be read off. Also provided is a ROM FS with a number of memory locations, in each one of which is stored an instantaneous value of the slope of a typical echo signal in the form of a bit group. The number of the memory locations is chosen in such a manner that for each phase position of the clock pulses that can be determined by the phase grid steps, the instantaneous values of the slope of an echo signal for m successive clock pulses can be stored. Suppose for example that 128 phase grid steps are provided for the shift of the phase position and that the instantaneous values for eight successive clock pulses (scanning points) are to be considered. Then 1,024 storage places will be required. In order to select the memory locations the ROM is connected through its address inputs to line system Z2L, by means of which it receives the counter readings of the forward/backward counter Z2, which are fed to it as addresses. The counter readings, as we have seen earlier, give the number of phase grid steps by which the phase of the clock pulses has been shifted with reference to a starting position. In each of these addresses determined by the counter readings are stored the instantaneous values, related to the respective phase position, of the slope of an echo signal for m consecutive clock pulses—that is, in the example selected here, for eight clock pulses. These instantaneous values assigned to the individual clock pulses are read off one after the other, and multiplied in a multiplier MUL1 in each case with the digital signal stored in signal memory DS for the clock pulse in question. For this purpose, the digital signals that are stored in the signal memory are likewise fed one after the other to the multiplier. Since it is assumed that the digital signals occurring on signal sending line SD are binary signals, the multiplication proceeds on the principle that for a logic 1 digital signal at the outputs of the multiplier, the instantaneous value existing simultaneously at its inputs is emitted in the form of a bit group, while for a logic 0 digital signal, an instantaneous value of "zero" is emitted. By this means it is ensured that when digital signals are transmitted, only the logic 1 signals make a contribution to the echo signals.

The outputs of multiplier MUL1 are connected with an accumulator, which collects the instantaneous values emitted by the multiplier over a time interval corresponding to the number m of clock pulses and delivers a corresponding sum signal in the form of a bit group at its outputs. This accumulator consists of adder SUM2 and register Reg1 connected downstream of it. The outputs of this register are connected with the first inputs of the associated adder. At other inputs, the adder is connected to the outputs of multiplier MUL1.

Register Reg1 referred to above is also connected at its outputs with the first inputs of another multiplier MUL2. At other inputs, this multiplier receives a time signal that has been curtailed in proportion to the control data accumulated in the forward/backward counter Z1 of timing generator T with respect to the upper or lower threshold, as the case may be, and is fed in coded form. In this instance, the total size of the time signal corresponds to one phase grid step of the clock signals. From this curtailed time signal and the summed signal emitted by register Reg1, the multiplier MUL2 forms the correction signal referred to above and feeds it to adder SUM1. In order to generate the curtailed time signal, there is provided in correcting device KE a register Reg2, which is connected with line system Z1L in order to receive the control data accumulated in forward/backward counter Z1. On the output side, this register is connected to the first inputs of multiplier MUL3. Further inputs of this multiplier are connected with register Reg3, in which is stored a constant, which gives the total size of a phase grid step divided by the number of the control data belonging to the upper or lower threshold as the case may be. From this constant and the number of control data which is stored in register Reg2, multiplier MUL3 forms the curtailed time signal.

Using the pulse diagram shown in FIG. 3, we shall once again clarify the process for the compensation of echo signals in accordance with the invention. For this purpose, two echo signals ES1 and ES2 which are shifted with respect to one another are shown under a. The maxima of these echo signals are designated by M1 and M2, respectively. The maximum M1 in this case is meant, for example, to be scanned by the rising edge of a receiving clock pulse ET in receiving device EE of FIG. 1 (b in FIG. 3). This may be the starting phase position of the receiving clock pulses emitted by timing generator T. In this phase position, the echo signal received together with a digital signal is fully compensated by the compensation signal that is emitted at this moment by echo compensator EK. If there now occurs a change in the phase position between the sending clock pulses and the receiving clock pulses, then a shift in the phase position of these clock pulses would be necessary for the full compensation of an echo signal. Under a in FIG. 3 it has been indicated, by way of example, that the maximum of an echo signal now occurs after some delay (M2 of the echo signal ES2). The complete compensation of this echo signal by a compensation signal emitted by the echo compensator could now take place, for instance, by causing the phase position of the receiving clock pulses to be shifted by a specified amount. This is indicated under c by the broken line showing the path of the receiving clock pulse ET'. The shift of the phase position may in this case be within a phase grid step, by which the clock pulses can be shifted in timing generator T. A shift pulse VS designed for this purpose is shown under d in FIG. 3. With this shift pulse there is also shown a phase grid step RS.

Now, using the process in accordance with the invention, instead of an immediate shift in the phase position, the control data that is emitted by receiving control device ES on the basis of the changed phase position is initially accumulated in forward/backward counter Z1, while the phase position that has been specifically set in each case is maintained. Under e are shown control data SI that must be emitted by receiving control devices ES for phase fluctuations within a single phase grid step RS. In this case it has been indicated by way of example that when the phase position changes by one phase grid step, ten control data are fed by the receiving control device to forward/backward counter Z1. This number of control data constitutes the upper or lower threshold for the forward/backward counter; when this threshold is reached, adjustment information for the shifting of the phase position by one phase grid step RS is supplied to pulse generator TG.

A comparison with the echo signals, sections of which are shown under a in FIG. 3, shows that the echo signal ES2, due to its delayed occurrence at the scanning time determined by the receiving clock pulse ET, is effective only with amplitude value AW. On the other hand, echo compensator EK (FIG. 1) continues to emit a compensation signal that corresponds to echo signal ES1 but is too large when compared with the amplitude value AW of echo signal ES2. The uncompensated echo component that occurs as a result is now compensated with the aid of the correction signal generated by correcting device KE (FIG. 2). In order to form this correction signal, in the example selected in FIG. 3, four control data are accumulated in the forward/backward counter Z1. On the basis of this counter reading, which is received in register Reg2 of correcting device KE, and the constant stored in register Reg3, the multiplier MUL3 of the correcting device computes the curtailed time signal that has already been referred to above. The upper or lower threshold, as shown in e of FIG. 3, goes into the constant, which is obtained by dividing the time interval corresponding to one phase grid step by the upper or lower threshold of the forward/backward counter Z1, 10 times.

Since in the example selected here, the phase position of the receiving pulse signals with respect to the starting position is supposed to have changed only within one of the phase grid steps RS used to measure the shift in the phase position, the upper or lower threshold is not exceeded by the control data accumulated in forward/backward counter Z1. As a result, no adjustment information is fed to pulse generator TG and forward/backward counter Z2. Forward/backward counter Z2 is therefore still in its starting position. With the counter reading emitted in this starting position, constant-value memory FS is triggered for the output of the instantaneous value of the slope of an echo signal that is assigned to this starting phase position. From these instantaneous values, taking into account the curtailed time signal, there is then computed the correction signal required for the starting phase position in order to compensate the echo signals.

With reference to FIG. 3, we initially considered only the case in which the change in the phase position of the clock pulses was merely a small one, lying within one phase grid step. In the event of a change in the phase position that goes beyond a single grid step, the upper or lower threshold, depending on the direction of the change in the phase position, will be exceeded by the control data in forward/backward counter Z1. As a result, the forward/backward counter will give appropriate adjustment data to pulse generator TG of timing generator T, according to which forward/backward counter Z1 will be returned to its starting position. A small change of the phase position, lying within the phase grid step that is now applicable, will then be treated in the manner that has already been illustrated above.

It should be further noted at this point that the instantaneous values of the slope of an echo signal at a specified scanning time can also be derived from the instantaneous values, occuring at this scanning time, of the slope of the respective undistorted digital signal that is emitted by the sending device of the signal transmission unit in question. For the storage of these instantaneous values ROM FS, shown in FIG. 2, is replaced by a write/read memory.

Correcting device KE, shown in FIG. 2, can also contain a microprocessor to compute the correction signals, instead of the circuit elements shown in FIG. 2.

With regard to the term "digital signals" it should be noted that data signals, voice signals and/or text information signals are included under this concept.

Finally, we should observe, with regard to abovementioned echo compensator EK, that it can be constructed as described in British Pat. No. 2 007 946 A. Another possible embodiment is reported in "IEEE Transactions on Communications," Vol COM-30, No. 9, September 1982, 2095-2108, particularly in FIG. 4b.

There has thus been shown and described a novel method and circuit arrangement for the compensation of echo signals which fulfills all the objects and advantages sought therefor. Many changes, modifications, variations and other uses and applications of the subject invention will, however, become apparent to those skilled in the art after considering the specification and the accompanying drawings which disclose embodiments thereof. All such changes, modifications, variations and other uses and applications which do not depart from the spirit and scope of the invention are deemed to be covered by the invention which is limited only by the claims which follow.

What is claimed is:

1. In a method for the compensation of echo signals in a signal transmission unit for the duplex transmission of digital signals which signal transmission unit is connected to a duplex channel arrangement with a two-wire line, which signal transmission unit includes a sending device and a receiving device, and in which signal transmission unit, compensation signals are generated by an echo compensator for the compensation of echo signals that are received in the receiving device of the signal transmission unit when digital signals are sent by the sending device of the signal transmission unit over the two-wire line where, echo compensation signals are subtracted in the receiving device of the signal transmission unit from digital signals and the echo signals received in the receiving device at scanning times that occur in uniform time intervals, and, where adjustment data are fed by the receiving device to a timing generator to regulate the phase position of clock pulses of a clock pulse sequence in predetermined phase grid steps which clock pulses determine by their occurrence the scanning times, the improvement in said method comprising the steps of:

(a) accumulating control data for shifting the phase position of the clock pulses by an amount determined by a phase grid step and maintaining a phase position that has been previously set;

(b) deriving correction signals based upon the accumulated control data and summing said correction signals with the echo compensation signals so that echo signals are substantially eliminated; and (c) shifting the phase position of the clock pulses by only one phase grid step when the accumulated control data reaches a predetermined threshold.

2. The method of claim 1, further comprising the steps of summing a predetermined number of individual signals for the derivation of a correction signal at a particular scanning time, with said individual signals being derived from successive digital signals occurring in the sending device of the signal transmission unit, each of the said successive digital signals being multiplied by an instantaneous value of the slope of a received echo signal; and multiplying the sum of the individual signals by a time signal that is proportionate to the accumulated control data.

3. The method of claim 2, further comprising the step of deriving the instantaneous value of the slope of an echo signal from the instantaneous value of the slope of a digital signal that is emitted by the sending device of the signal transmission unit.

4. The method of claim 2, further comprising the step of deriving the instantaneous value of the slope of an echo signal at a desired scanning time from the instantaneous value of the slope of an echo signal occurring at that scanning time whereby the slope of said echo signal is stored for each phase grid step of the clock pulses.

5. In a circuit arrangement for the compensation of echo signals in a signal transmission unit for the duplex transmission of digital signals wherein the signal transmission unit has a sending device emitting a digital signal to a two-wire line, a receiving device that receives digital signals from the two-wire line at specified scanning times, an echo compensator for the compensation of echo signals that occur in the receiving device when digital signals are fed by the sending device of the signal transmission unit to the two-wire line, which echo compensator derives compensation signals corresponding to the said echo signals and couples said signals to the receiving device, and a timing generator to which adjustment data are fed by the receiving device to regulate the phase position of clock pulses of a clock pulse sequence in predetermined phase grid steps, which clock pulses are determined by their occurrence scanning times, the improvement comprising:

the timing generator including an accumulator which accumualtes control data fed to it by the said receiving device, which control data signify that a shift of the phase position of the clock pulses by an amount corresponding to a predetermined phase grid step is required, while maintaining the phase position that has been previously set and wherein said accumulator, when either a predetermined upper threshold is exceeded, or when a predetermined lower threshold is not reached as determined by the accumulated control data, derives adjustment data which, when coupled to the timing generator, effects a shift of the phase position of the clock pulses by one phase grid step, thereby cancelling the accumulated control data;

and wherein the signal transmission unit includes a correcting device, which correcting device is adapted to emit, on the basis of the accumulated control data, correction signals that are summed with the compensation signals, such that the echo signals are substantially eliminated.

6. The circuit arrangement of claim 5, wherein the correcting device comprises:

for the generation of a correction signal to be emitted at a certain scanning time, a first control device which delivers as its output, one after another, a number of individual signals that are formed from successive digital signals each of which is multiplied by an instantaneous value of the slope of an echo signal associated with the respective digital signal of the successive digital signals occurring in the sending device of the signal transmission unit at said certain scanning time;

another accumulator which receives the said individual signals emitted by the first control device and delivers a summed signal corresponding to the individual signals that have been fed to it;

a second control device which, in order to receive the accumulated control data, is connected at its input side with the accumulator of the timing generator, and which second control device delivers at its output a time signal which is proportionate to the accumulated control data; and a multiplier which is connected at its input side with the output of the first control device and with the output of the second control device, and which multiplier delivers the correction signal at its output.

7. The circuit arrangement of claim 5, wherein the accumulator of the timing generator comprises a forward/backward counter.

8. The circuit arrangement of claim 6, wherein the first control device comprises:

a first memory with a large number of memory locations in which the said instantaneous value of the slope of an echo signal for the individual phase grid steps of the phase position of the clock pulses are stored;

a second memory for the intermediate storage of a predetermined number of said successive digital signals; and a multiplier which delivers at its output as individual signals, one after another, the intermediate stored digital signals, each multiplied by the instantaneous value of the echo signal associated with the respective digital signal of the said successive digital signals at the certain scanning time.

9. The circuit arrangement of claim 6, wherein the second control device comprises:

a first register for receiving the control data accumulated in the accumulator of the timing generator;

a second register in which a value derived from the time signal and the upper or lower threshold is stored; and a multiplier connected to the first and the second registers, which multiplier emits the time signal, reduced in accordance with the accumulated control data.

10. The circuit arrangement of claim 5, wherein the correction device contains a microprocessor.

* * * * *